July 23, 1940.  C. M. SAVRDA  2,208,645

FISH TREATING MACHINE

Filed Aug. 27, 1938  7 Sheets-Sheet 1

INVENTOR.
CHARLES M. SAVRDA
BY Wm. S. Pritchard
ATTORNEY.

July 23, 1940. C. M. SAVRDA 2,208,645
FISH TREATING MACHINE
Filed Aug. 27, 1938 7 Sheets-Sheet 2

INVENTOR.
CHARLES M. SAVRDA
BY WM. S. Pritchard
ATTORNEY.

July 23, 1940. C. M. SAVRDA 2,208,645
FISH TREATING MACHINE
Filed Aug. 27, 1938 7 Sheets-Sheet 4

INVENTOR.
CHARLES M. SAVRDA
BY WM. S. Pritchard
ATTORNEY.

July 23, 1940.  C. M. SAVRDA  2,208,645
FISH TREATING MACHINE
Filed Aug. 27, 1938  7 Sheets-Sheet 5

INVENTOR.
CHARLES M. SAVRDA
BY WM. S. Pritchard
ATTORNEY.

July 23, 1940.    C. M. SAVRDA    2,208,645
FISH TREATING MACHINE
Filed Aug. 27, 1938    7 Sheets-Sheet 7

INVENTOR.
CHARLES M. SAVRDA
BY WM. J. Pritchard
ATTORNEY.

Patented July 23, 1940

2,208,645

UNITED STATES PATENT OFFICE 2,208,645

FISH TREATING MACHINE

Charles M. Savrda, Bay Shore, N. Y., assignor to The Atlantic Coast Fisheries Company, New York, N. Y., a corporation of Maine Application August 27, 1938, Serial No. 227,101

22 Claims. (Cl. 17—3)

This invention relates to a machine for scaling, beheading and cleaning fish, and has for an object to provide a machine of the above type having novel and improved operating characteristics.

Another object is to provide, in a machine of the above type, novel and improved means for continuously feeding fish to the scaling, cutting and cleaning stations.

Another object is to provide for automatically positioning the fish on the conveyor so that the head will be severed at the desired point and at the desired angle.

Another object is to provide positioning mechanism which is adapted to handle fish of different sizes and types.

Another object is to provide mechanism for utilizing the pectoral fin of the fish for automatically positioning the same.

Another object is to provide a unitary, compact and efficient machine for scaling, cutting and cleaning fish.

Various other objects and advantages will be apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings, in which a particular embodiment thereof has been set forth for purposes of illustration.

In the drawings,

Figures 5 and 6 are sectional views of the hold-down bars, taken along the lines 5—5 and 6—6, respectively, of Figure 4a;

In the following description and in the claims certain specific terms are used for convenience in referring to various details of the invention. It is to be understood, however, that these terms are to be given as broad an interpretation as the state of the art will permit.

Figure 10:
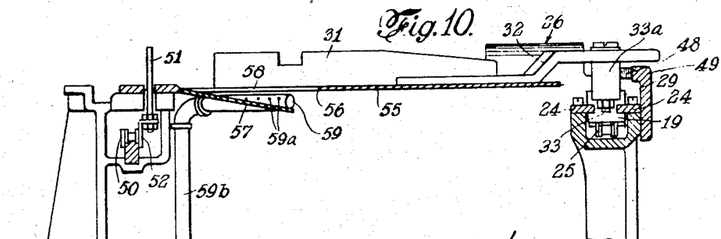
Figure 10 is a section taken along the line 10—10 of Figure 9.

Referring to the drawings more in detail, the machine is shown as comprising a frame 10 (Figure 2), having at opposite ends pillow blocks 11 and 12 which support shafts 13 and 14, respectively. The shaft 13 carries conveyor sprockets 15 and 16, and the shaft 14 carries conveyor sprockets 17 and 18. The shaft 14 also carries a drive sprocket 20 which is driven by a belt or chain 21 from a reducing gear train 22 actuated by a motor 23 of any suitable type. The sprockets 16 and 18 carry a conveyor chain 25 on which are mounted, at suitable intervals, channel guide blocks 19 (Figures 7 and 10) which slide between guide rails 24 extending along the frame 10 on opposite sides of the chain 25 and carry gripping devices 26 (Figures 1, 7 and 10) which are adapted to grip and hold the fish while being fed to the various treating stations.

Each of these gripping devices 26 comprises a block 29 which is adjustably attached to the channel guide block 19, as by a screw 27 (Figure 8) about which it may be pivoted, and clamping screws 28 extending through arcuate slots 28a in said block 29, and carries a rigid arm 30 (Figures 1 and 8) having a surface 31, against which the fish is positioned.

An arm 32 (Figures 1, 7, 8 and 10) is pivoted to the block 29 by a bolt 33 extending through a boss 33a carried by said arm, and is provided with a plurality of fingers 34 (Figures 1 and 8) which are adapted to engage and grip the fish at or near the tail thereof. The fingers 34 are progressively shorter in length towards the end of the arm 32 and enter recesses 35 in the arm 30 (Figure 8), so that only one or two of the fingers, for example, will come in contact with the fish regardless of the length of the particular fish which is placed in the gripping mechanism. If, for example, the longer fingers engage the fish, the shorter fingers are held out of contact therewith. In the case of a short fish, the arm 32 closes against the arm 30 until a suitable gripping contact is made.

Each arm 32 carries a roller 40 (Figure 8) which engages a plunger 41 held in a cylinder 42 formed on the arm 30 and carrying a spring 43 which urges the plunger 41 outwardly and thereby holds the arm 32 in resilient gripping engagement with the arm 30.

Figure 7:
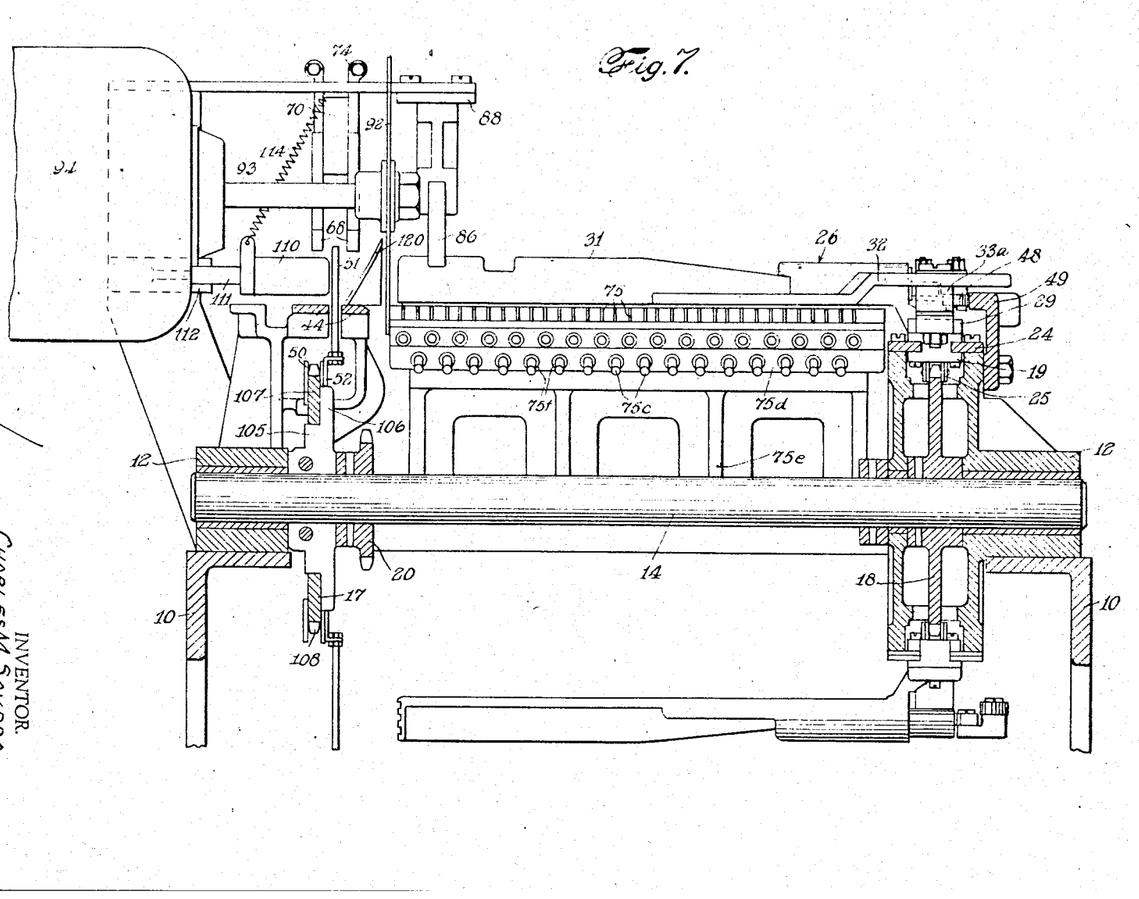
Figure 7 is a section taken along the line 7—7 of Figure 4b.
Figure 8:
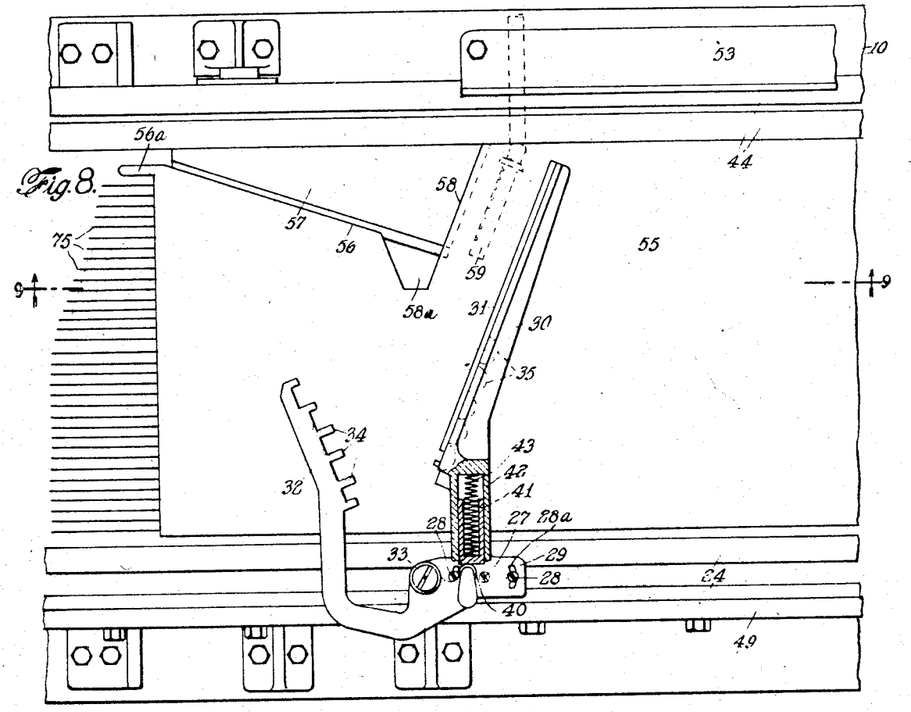
Figure 8 is a detail view of the positioning means.

For opening the gripping devices to permit the fish to be inserted and properly positioned therein, there is provided a roller 48 (Figures 7 and 10) carried by the arm 32 and engaging a cam rail 49 (Figures 1, 7 and 10) which extends along the machine from a point near the receiving end to a point at which the fish has been properly positioned. As the gripping device is advanced along the machine by the chain 25, the roller 48 engaging the cam rail 49 holds the arm 32 in open position, as illustrated in Figure 8. When the roller 48 rides off the end of the cam rail 49, the spring 43 closes the arm 32 and causes the same to grip and hold the fish. A long fish is engaged by the longer fingers 34 which hold the shorter fingers out of contact with the fish, whereas with a shorter fish the gripping device closes until one of the shorter fingers 34 engages the same.

The sprockets 15 and 17 carry a chain 50 (Figures 1, 7 and 10) to which a plurality of pins 51 are attached by means of brackets 52. These pins 51 advance between horizontal plates 44 (Figures 1 and 3) which are mounted on the frame 10 and extend along the machine to support the heads of the fish. A vertical guide rail 53 is mounted to extend along a part of the machine, as will be described, to form a stop for initially positioning the heads. The pins 51 are arranged in substantial alignment with the ends of the arms 30 to engage the heads which overhang the arms 30 and prevent the same from bending backwardly as they are fed through the machine by the gripping devices 26. This is particularly advantageous for treating long, slender fish, which are more or less flexible.

Figure 9:
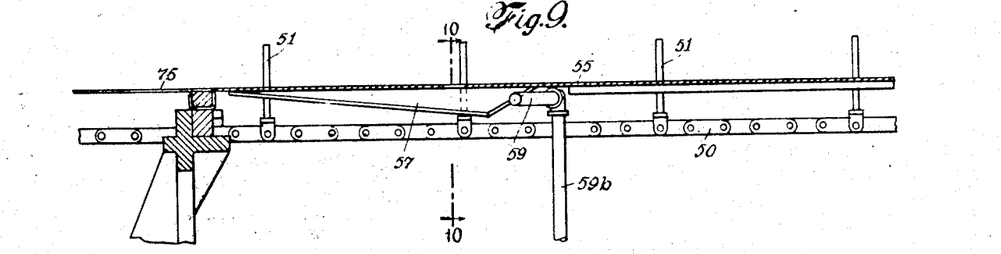
Figure 9 is a section taken along the line 9—9 of Figure 8.

The automatic positioning mechanism comprises a base plate 55 (Figures 1, 8 and 9) on which the fish slide as they are advanced by the arms 30. The fish are manually positioned on the base plate 55 with their heads extending toward the pins 51 and preferably with their backs toward the surface 31 of an advancing arm 30. When so positioned, lateral movement of the arms 30 causes the heads to slide longitudinally of the arms until they engage the vertical guide rail 53. It has been found, however, that, regardless of the size of the fish, the heads should be cut just in back of the pectoral fin and at an angle toward the belly such that the entrails can be easily removed. Fish of different sizes must, accordingly, be fed to the cutter with their heads overhanging by different amounts.

In order to use these pectoral fins as guides and as automatic positioning means, the base plate 55 is provided with a guiding edge 56 which extends at an angle to the direction of feed of the fish, so as to shift the fish transversely of the machine to the predetermined position. The trailing portion 56a of the edge 56 is extended parallel to the direction of feed, so as to hold the fish in adjusted position until the gripping devices close thereon. The guide rail 53 terminates at a suitable point to release the head of the fish after the fin has been engaged by the edge 56 of the plate 55, in the manner above mentioned.

The base of the pectoral fin is strongly attached to the body of the fish and provides a dependable guiding and positioning means. This fin, however, is thin and flexible at the end and may adhere to the body of the fish, particularly when wet as in the present machine. Means is accordingly provided to loosen the fin from the body so that it can extend beneath the plate 55 as above mentioned. For this purpose an inclined plate 57 is provided which extends beneath an opening 58 in the plate 55 formed by cutting the plate away to produce the guiding edge 56. The opening 58 is extended, as at 58a, to provide clearance for receiving the fin in the manner to be described. The plate 57 is inclined at an angle to form a stop for the fin and to guide the fin beneath the edge 56 of the plate 55.

In order to loosen the fin from the body of the fish and to force the same downwardly against the plate 57 there is provided a nozzle 59 having a plurality of openings 59a, forming jets which are directed against the pectoral fin of the fish and are preferably arranged so that the fluid discharged therefrom extends at an angle toward the head of the fish and engages the body of the fish beneath the pectoral fin so as to force this fin downwardly toward the plate 57. The latter plate forms a stop to prevent the fin from being bent backwardly by the force of the jets. It is to be understood that the nozzle 59 may be connected by a pipe 59b to a suitable source of fluid pressure. The nozzle 59 is shown as extending about parallel to the arm 30 and arranged to project the fluid stream against the pectoral fin from the side. The nozzle may, however, be placed in other positions and may be arranged to project the stream toward the head of the fish or toward the base of the fin, as may be required. In any event, the fluid releases the fin from the body and causes the same to pass through the recess 58a and to be engaged beneath the edge 56 of the plate 55.

After the fish has advanced beyond the end of the edge 56 the roller 48 of the arm 32 rides off the end of the cam rail 49, thereby permitting the arm 32 to close and grip the fish for holding the same against further transverse movement.

In order to hold the fish down against the base plate 55 with the pectoral fin in position to extend beneath the edge 56 thereof, a plurality of presser bars 68 are provided (Figures 2, 4, 4a and 4b). These presser bars 68 are each mounted on a pair of links 69 which are pivoted to a bar 70 mounted on brackets 71 (Figure 1) attached to the frame 10. The bars 68 are held downwardly by springs 72 extending between ears 73 on alternate links 69 and ears 74 on the bar 70. The springs 72 are designed to hold the head of the fish down against the base plate 55 with the fin extending under the edge 56 thereof in the manner above described, and to prevent the fish from turning as it advances. Stop pins 69a are provided on the bar 70 to limit the swing of the links 69 having the ears 73. Alternate bars 68 are mounted on opposite sides of the bar 70 with their ends overlapping, so that the straight lower surfaces of the bars 68 continuously engage the fish as they are fed along the machine. The bars 68 may extend along the entire length of the machine, and preferably extend to the cutting station, to hold the fish during the cutting operation. The forward bar 68 (Figure 4) which first engages the fish as the fish is fed along the machine, may be provided with teeth 68a which are adapted to engage the fish so as to turn the fish upon its side if the fish has been rolled out of position by the movement of the arms 30 over the base plate 55.

Extending from the end of the base plate 55 to the discharge end of the machine are a plurality of supporting wires 75. These wires 75 and the guide plates 44 interpose a minimum amount of friction to the sliding fish and allow free passage of the spray for scaling, to be described. The wires 75 are held at one end by a cross bracket 75a (Figure 4a), extending across the machine and having apertures 75b, through which the ends of the wires extend. At the other end the wires 75 are attached to screws 75c (Figure 4b) held in a cross bar 75d mounted on a bracket 75e. The screws 75c are provided with adjusting nuts 75f by which the tension on the wires 75 may be adjusted.

A curtain 60 made of rubber or other flexible material (Figures 2 and 4a) may be mounted upon a bracket 61 in a position to extend across the wires 75 near the forward end thereof. This curtain 60 forms a wiper which is adapted to engage the fish, and, after the same has been positioned by the edge 56 of the plate 55, brings the fish into proper position against the arm 30 before the gripping device closes.

Mounted above and below the wires 75 are headers 76 and 77 (Figures 1, 2 and 3) having nozzles 78 and 79, respectively, which are adapted to direct water under pressure against the top and bottom of the fish for removing scales therefrom. It will be noted that the headers 76 and 77 are connected by a pipe 80 to the discharge end of a pump 81 which receives water from a tank 82 and supplies the same under pressure to the nozzles 78 and 79 for the purpose above mentioned. The tank 82 is positioned beneath the wires 75 so as to receive the water and scales from the fish. A screen 83 may be provided in the tank 82 to separate the scales and permit the water to be used in a continuous cycle. The headers 76 and 77 are shown as inclined in the direction of travel of the fish and the nozzles 78 and 79 are adapted to direct a stream of water or other fluid in an inclined direction toward the head of the fish, the various nozzles progressively treating the fish from the tail to the head, so as to effectively strip the scales therefrom. It is to be understood, however, that with certain types of fish, where the scales are large and very strongly attached to the body, it may be desirable to scale the fish in the opposite direction; that is, from the head to the tail. To accomplish this, the headers will be mounted at a point further along the machine and will point in the opposite direction, the nozzles being so adjusted that the first sprays will strike the fish so as to remove the scales near the head, and the other sprays will strike the fish progressively down to the tail. The nozzles may have a flattened end, if desired, to cause the stream to spread across the fish.

After the fish has been scaled in the above manner it is fed to a rotating saw 92 (Figures 1, 3 and 4b) which is mounted on a shaft 93 driven by a motor 94, and is so positioned in respect to the guiding edge 56, above mentioned, that the fish will be cut just in back of the pectoral fin and along a line extending at an angle toward the belly as determined by the direction of the arms 30. The saw 92, as shown in Figure 4b, is mounted so that the bottom thereof extends slightly below the level of the wires 75 and the forward edge of the saw rotates in an upward direction. This position and direction of rotation of the saw prevent the fish from becoming wedged and assist in producing a clean, even cut. The row of presser bars 68 is shown as extending to a point opposite the saw 92. These bars are located to engage the fish beyond the pectoral fin, so as to hold the head in position during the treating of the fish by the mechanism above described. For holding the body of the fish after the head is removed, there may also be provided fingers 86 which are pivotally mounted on brackets 87 (Figures 3 and 4b) carried by a bar 88 which is supported by a bracket 88a from the frame 10. The fingers 86 may be held by springs 89 in proper position to resiliently engage the fish. A screw 90 may be provided to form an adjustable stop for each of the fingers 86. These fingers 86 are located on the side of the saw so as to engage the body of the fish and prevent the same from shifting during the sawing operation. If desired, the fingers, and preferably the first finger 86, are weighted, as by providing a weight 86a thereon. It is to be understood, of course, that similar fingers may be mounted at other parts of the machine, or may replace certain of the presser bars 68.

To assist in removing the head, there may be provided a plate 110 which is mounted on a pivoted arm 111 attached to a bracket 112 carried by the frame of the machine. The plate 110 is held by a spring 114 in a forward position and is attached to clear the pins 51. The spring 114 permits movement of the plate 110 as it is engaged by the head of the fish. The plate, however, tends to draw the head away from the body of the fish as the head is cut therefrom by the rotating saw 92. A guide plate 120 is provided which is mounted between the pins 51 and the saw 92 and is shaped to guide the heads downwardly and outwardly to the receiving means as the fish is advanced past the saw.

The removal of the head of the fish in the manner above mentioned permits the greater part of the entrails to fall out, and leaves the fish in a comparatively clean condition. If it is further desired to clean the fish, this may be accomplished by providing one or more jets 98 (Figures 1 and 3) which are positioned so as to discharge fluid under pressure into the nape cavity of the fish, to thereby wash out the entrails and clean the inside of the fish. The jets 98 may be connected to the pipe 80 or may be supplied with fluid under pressure in any other suitable manner. The nozzle 59 may likewise be connected with the pipe 80, if desired.

Figure 1:
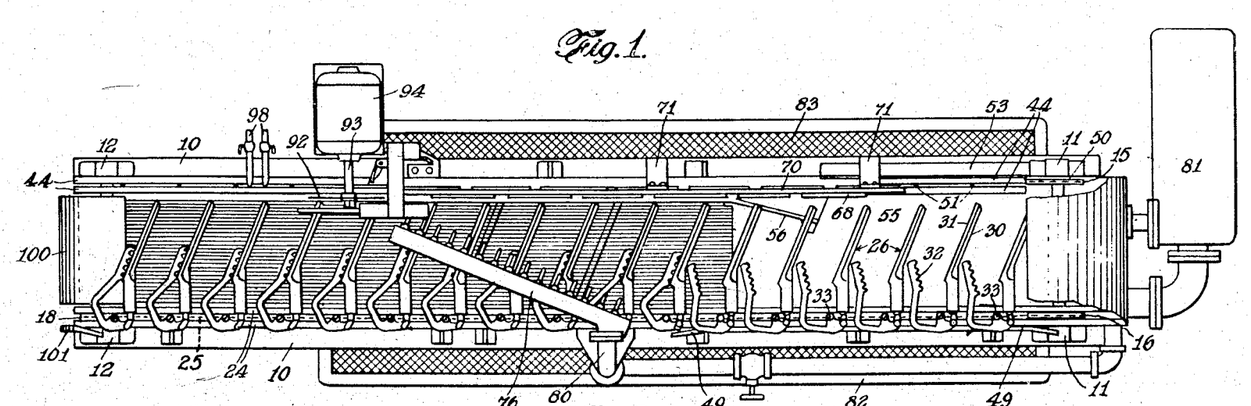
Figure 1 is a top plan view of a scaling, cutting and cleaning machine embodying the present invention.
Figure 2:
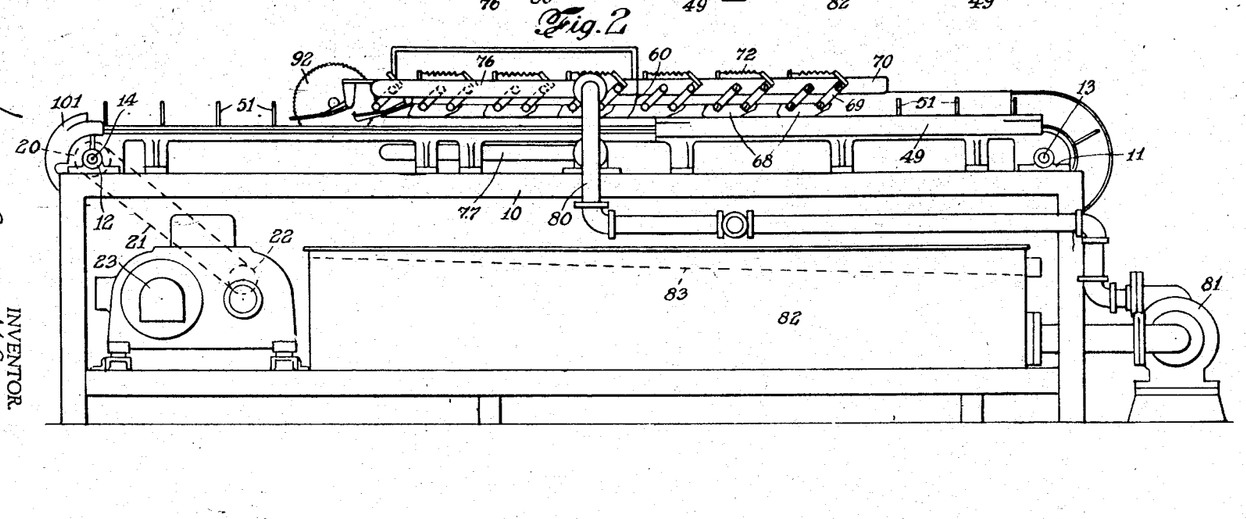
Figure 2 is a side elevation thereof.
Figure 3:
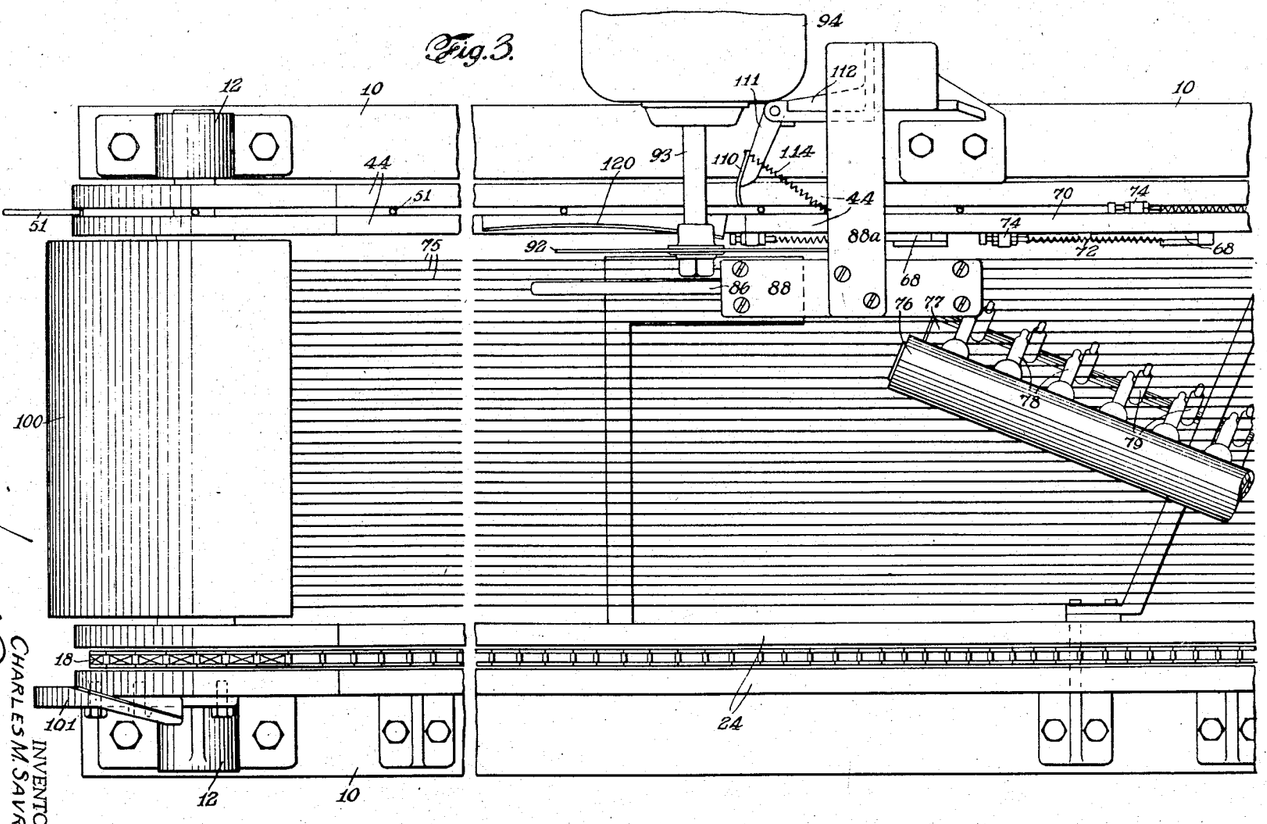
Figure 3 is an enlarged plan view of a portion of the machine showing the cutting and cleaning stations.
Figure 4:
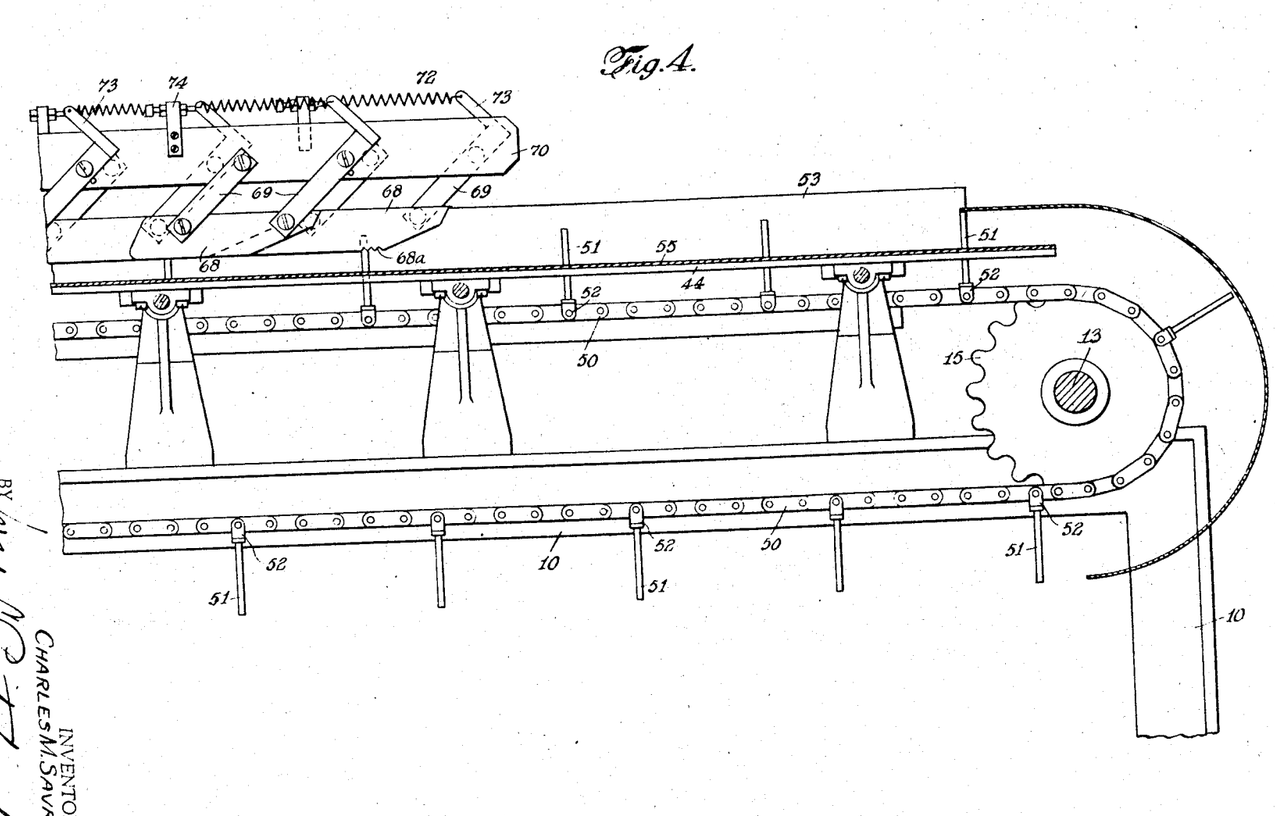
Figures 4, 4a and 4b are enlarged longitudinal sections of the machine showing the receiving end, the center of the machine, and the discharge end, respectively.
Figure 4A:
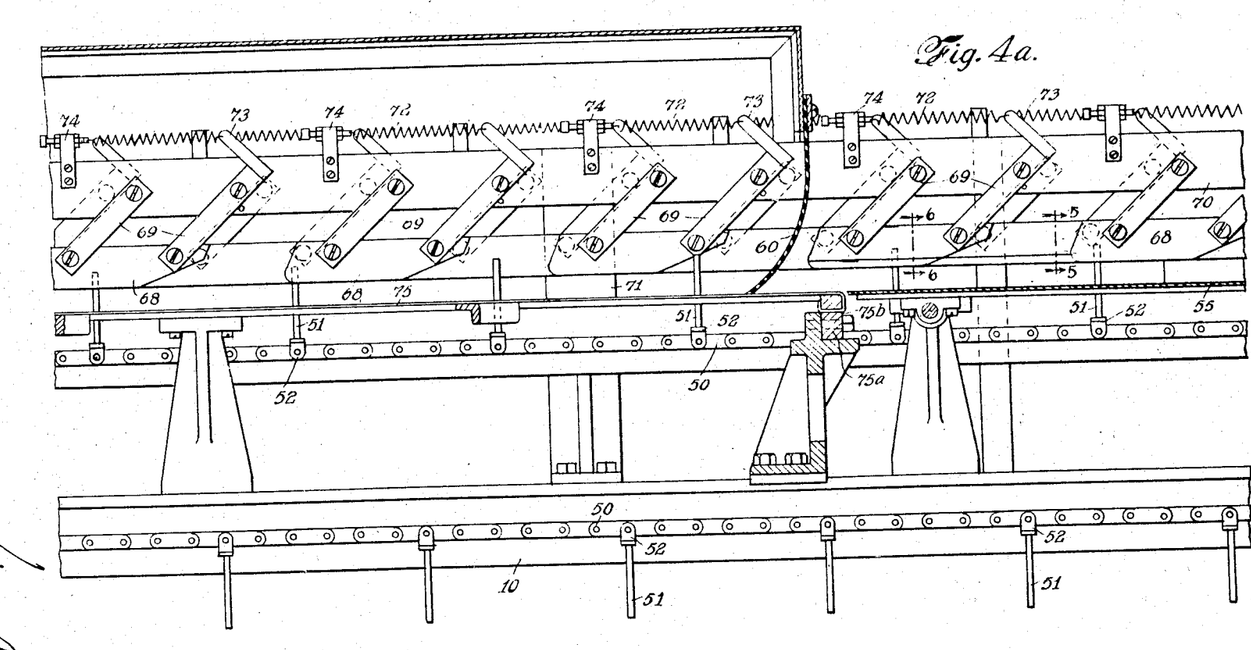
Figure 4B:
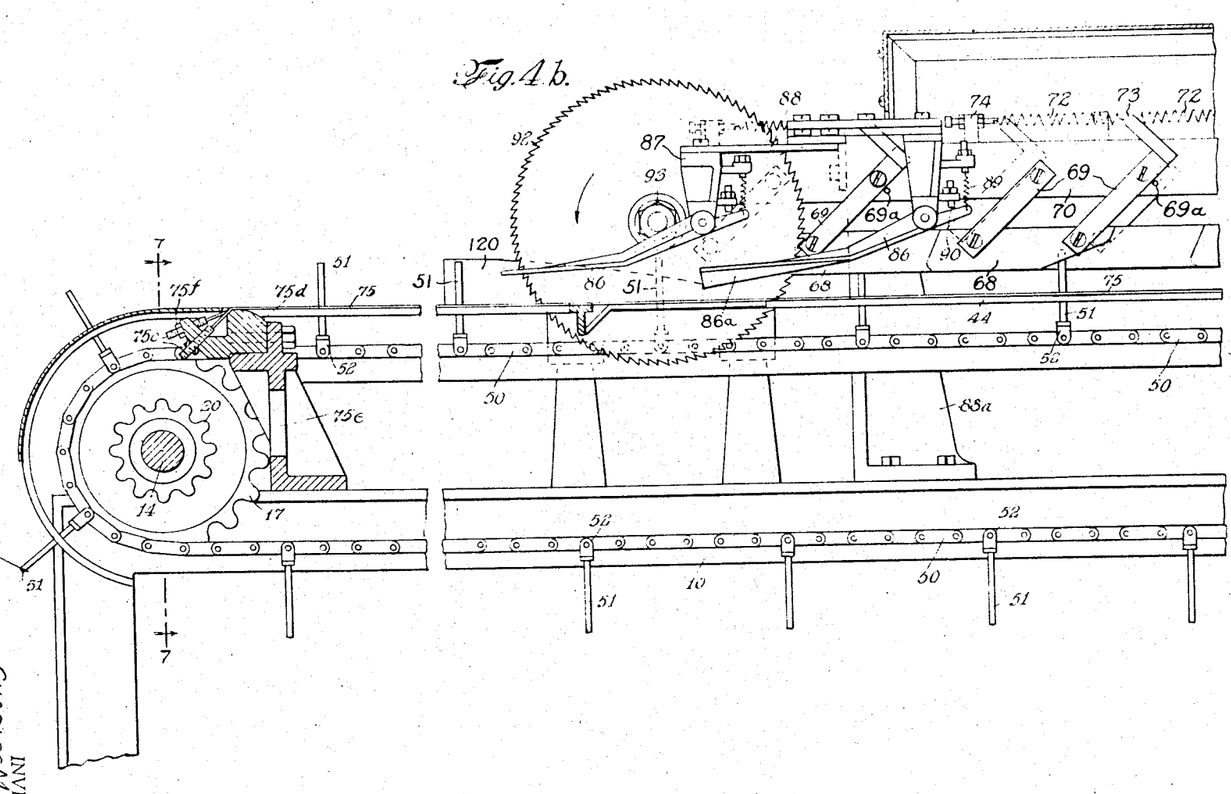
Figure 5:
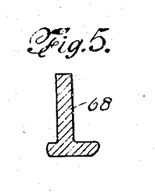
Figure 6:
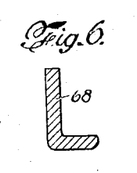

At the discharge end the machine is provided with a discharge plate 100 (Figures 1 and 3). A circular cam rail 101 is also provided to engage the roller 48 and open the arm 32, thereby releasing the fish from the gripping device and permitting same to fall into a suitable receptacle, not shown, beneath the discharge plate 100.

It will be noted that provision is made for adjusting the angular position of the arms 30. Provision may also be made for adjusting the position of the pins 51 so that the pins remain in proper alignment with the ends of the arms 30. For this purpose, the sprocket 17 is provided with a hub 105 having a flange 106 to which a ring 107 is adjustably secured (Figure 7). The ring 107 is provided with teeth 108 engaging the chain 50. The chain 50 may accordingly be advanced or retarded as required with respect to the chain 25.

In the operation of this machine, as the grippers are advanced from the receiving end, the arm 32 is opened by the roller 48 engaging the cam rail 49. The fish are now manually placed on the base plate 55 with their backs toward the edge 31 of the arm 30 of the gripper, and with their heads extending toward the guide rail 53. In this position the heads rest upon the plates 44 and are engaged by the pins 51 which advance with the arms 30.

As the fish are advanced by the arms 30 over the base plate 55 the lower pectoral fin is engaged by the jet of water issuing from the nozzles 59 which loosens the fin from the body and causes the same to be flexed downwardly into engagement with plate 57. During this part of its movement the fish is positioned by the head resting against the guide rail 53.

As the fish is further advanced by the arm 30 (with the arm 32 still held in open position by the cam rail 49), the pectoral fin is caused to extend beneath the guiding edge 56 of the base plate 55. As the fin slides along this edge 56, the fish is advanced transversely of the machine to a position dependent upon that of the trailing portion 56a of said edge. During this portion of its travel, the fish is held down against the base plate by the presser bars 68. As the fish is advanced transversely by the guiding edge 56, the head is caused to extend laterally beyond the end of the guide rail 53 and is supported by the plates 44.

The fish now passes under the flexible wiper 60 which exerts sufficient pressure to insure that the fish is properly positioned against the arm 30. The roller 48 now rides off the end of the cam rail 49, permitting the arm 32 to close against the fish, thereby securely holding the fish against further transverse movement.

It will be noted that the arm 32 grips and securely holds the fish, regardless of the size thereof. A long fish, for example, is gripped by the longer fingers 34 which hold the remaining fingers out of contact with the remaining fish, whereas, the shorter fish is engaged by the shorter fingers 34. In any event, only one or two of the fingers contact with the fish. This prevents the fingers 34 from interfering with the scaling operation.

The fish, now held clamped by the gripping device 26, is advanced over the longitudinal wires 75, past the nozzles 78 and 79 which direct fluid under pressure against the top and bottom of the fish and progressively from the tail to the head thereof, so as to effectively strip the scales therefrom. During this portion of its travel, the fish is held against displacement by the presser bars 68 which engage the fish at the head thereof and assist the gripping devices to prevent the fish from being shifted, turned, or otherwise displaced.

The fish, now scaled, is then further advanced to the cutting saw 92 which severs the head at a point in back of the pectoral fin and along a line which extends at an angle toward the belly of the fish. The particular location of the cut is determined by the position of the saw 92 with respect to the guiding edge 56. The angle at which the head is cut is determined by the angle of the arms 30. These may be adjusted by means of the screws 27 and 28, in the manner above pointed out, suitable adjustment also being made to cause the pins 51 to engage the head of the fish which overhangs the end of the arms 30.

As the head is being severed it is engaged by the plate 110 and by the guiding plate 120 which assist in removing the head and causing the same to drop into a suitable receptacle.

It has been found that a cut of the above nature may be made sufficiently deep in the belly of the fish to cause most of the entrails to fall out of their own accord and leave the fish in a comparatively clean condition. If any further cleaning is required, the same may be effected by the jets 98 which are positioned to direct a stream of fluid into the nape cavity of the fish for washing out and cleaning the inside thereof. The fish, which has now been scaled, cut, and advanced to the discharge plate 100 while the roller 48 is engaged by the circular cam rail 101 to open the arm 32 and thereby release the fish, falls into a suitable receptacle.

It will be noted that the above described machine automatically positions the fish, scales, cuts and cleans the same in a continuous operation and without intervening manual attention. Furthermore, the machine, by reason of the construction of the grippers and the positioning mechanism, is adapted to operate on different sizes of fish without receiving adjustments.

The positioning means operates automatically after the fish has been manually placed on the base plate 55 ahead of an advancing arm 30 and with its head at or near the guide rail 53. The pectoral fin is automatically loosened from the body and is engaged by the edge 56 of the base plate for positioning the fish for cutting. It is accordingly only necessary for the attendant to place the fish on the base plate with its back toward an advancing arm. The mechanism then automatically positions, scales, cuts and cleans the fish without further attention. The jet of water from the nozzles 59 is adapted to automatically loosen the fin from the body of the fish, even though the fish may adhere somewhat thereto. The jet of water issuing from the nozzles 59 accordingly insures that the fin is properly positioned to engage the guiding edge 56, as above mentioned. The presser bars 68 are positioned to engage the head of the fish, which is comparatively rigid and bony, and accordingly assist the gripping devices in holding the fish in proper position throughout its travel.

Certain types of fish may be positioned with their bellies toward the surfaces 31 of the arms 30 and the arms may extend forwardly, instead of rearwardly, so as to cut the heads along any desired line. The arms 30 may also be adjusted to cause the cut to extend far back toward the belly, if desired, and may be varied in accordance with the requirements of the fish being treated.

The rotation of the saw in a direction such that the forward edge of the saw moves upwardly, prevents the fish from being turned or wedged by the saw, and assures a uniform, clean, cutting action. During this operation the presser bars 68 and the fingers 86 hold the fish against displacement by the action of the saw.

Although a particular embodiment of the invention has been shown for purposes of illustration, it is to be understood that various changes and modifications may be made therein, as will readily appear to a person skilled in the art.

I claim:

1. In a fish-treating machine, conveyor means to feed fish sidewise through said machine, means for positioning the fish on said conveyor means comprising a guide member adapted to engage the pectoral fin of the fish as the fish is advanced, and a stop member extending beneath said guide member in a transversely inclined position to form a stop and support for the pectoral fin and to guide the same to a position to be engaged by said guide member.

2. In a fish-treating machine, conveyor means to feed fish sidewise through said machine, means for positioning the fish on said conveyor means comprising a guide member adapted to engage the pectoral fin of the fish as the fish is advanced, a stop member extending beneath said guide member in a transversely inclined position to form a stop and support for the pectoral fin and to guide the same to a position to be engaged by said guide member, and means to shift the fin downwardly against said stop member.

3. In a fish-treating machine, conveyor means to feed fish sidewise through said machine, means for positioning the fish on said conveyor means comprising a guide member adapted to engage the pectoral fin of the fish as the fish is advanced, a stop member extending beneath said guide member in a transversely inclined position to form a stop and support for the pectoral fin and to guide the same to a position to be engaged by said guide member, and a jet adapted to direct a fluid against the fin for loosening the same from the body of the fish and flexing the fin toward said stop member.

4. In a fish-treating machine, conveyor means to feed fish sidewise through said machine, means for positioning the fish on said conveyor means comprising a plate over which the fish slides, said plate having a side edge adapted to engage the pectoral fin of the fish as the fish is advanced thereover, and a second plate mounted below said first plate and extending beneath said side edge in a transversely inclined position, said second plate forming a guide and stop to limit the downward movement of the fin and to cause the same to be properly positioned for engagement by said side edge.

5. In a fish-treating machine, conveyor means to feed fish sidewise through said machine, means for positioning the fish on said conveyor means comprising a plate over which the fish slides, said plate having a side edge adapted to engage the pectoral fin of the fish as the fish is advanced thereover, a second plate mounted below said first plate and extending beneath said side edge in a transversely inclined position, said second plate forming a guide and stop to limit the downward movement of the fin and to cause the same to be properly positioned for engagement by said side edge, and means to loosen the fin from the body of the fish and to flex the same toward said second plate.

6. In a fish-treating machine, conveyor means to feed fish sidewise through said machine, means for positioning the fish on said conveyor means comprising a plate over which the fish slides, said plate having a side edge adapted to engage the pectoral fin of the fish as the fish is advanced thereover, a second plate mounted below said first plate and extending beneath said side edge in a transversely inclined position, said second plate forming a guide and stop to limit the downward movement of the fin and to cause the same to be properly positioned for engagement by said side edge, and a jet adapted to direct a fluid under pressure against the fin for loosening the same from the body and flexing the same toward said second plate.

7. In a fish-treating machine, conveyor means to feed fish sidewise through said machine, means for positioning the fish on said conveyor means comprising a plate over which the fish slides, said plate having a side edge adapted to engage the pectoral fin of the fish as the fish is advanced thereover, a second plate mounted below said first plate and extending beneath said side edge in a transversely inclined position, said second plate forming a guide and stop to limit the downward movement of the fin, and means engaging the fin to loosen the same from the body and to cause the same to flex toward said second plate, said first plate having a recess adapted to pass said fin as the fish is advanced thereover whereby the fin is caused to extend under said first plate and to be engaged by said side edge.

8. In a fish-treating machine, conveyor means to feed fish sidewise through said machine, means for positioning the fish on said conveyor means comprising a plate over which the fish slides, said plate having a side edge adapted to engage the pectoral fin of the fish as the fish is advanced thereover, said edge extending at an angle to the direction of feed to shift the fish across said conveyor means to a predetermined position, and a jet adapted to direct a fluid under pressure against said fin to loosen the same from the body of the fish and to cause the same to extend under said plate so as to be engaged by said side edge.

9. In a fish-treating machine, conveyor means to feed fish sidewise through said machine, means for positioning the fish on said conveyor means comprising a plate over which the fish slides, said plate having a side edge adapted to engage the pectoral fin of the fish as the fish is advanced thereover, said edge extending at an angle to the direction of feed to shift the fish across said conveyor means to a predetermined position, a jet adapted to direct a fluid under pressure against said fin to loosen the same from the body of the fish and to cause the same to extend under said plate so as to be engaged by said side edge, and a stop member beneath said first plate adapted to engage the fin and form a stop to prevent the fin from being bent backwardly by said fluid.

10. In a machine for beheading fish, a cutting member, conveyor means to feed fish sidewise to said cutting member, means for positioning the fish on said conveyor means comprising a guide member adapted to engage the pectoral fin of the fish as the fish is advanced and to thereby shift the fish across said conveyor means to a predetermined position with respect to the cutting member, and a jet positioned to direct a fluid under pressure against said fin to loosen the fin from the body and cause the same to engage said guide member.

11. In a machine for beheading fish, a cutting member, conveyor means to feed fish sidewise to said cutting member, means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and a jet positioned to direct a fluid under pressure onto said fin so as to loosen said fin from the body of the fish and cause the same to be engaged by said side edge.

12. In a fish-treating machine, a support for said fish, conveyor means for conveying the fish sidewise on said support, said conveyor means comprising gripping devices adapted to support and hold the fish at or near the tail thereof, and hold-down bars adapted to engage the fish at or near the head thereof to hold the same in position against said support, at least one of said hold-down bars having a straight lower edge beneath which the fish slides and having teeth formed at the forward portion thereof to engage the fish and properly position the same as it is advanced by said conveyor.

13. In a fish-treating machine, a support for said fish, conveyor means for conveying the fish sidewise on said support, said conveyor means comprising gripping devices adapted to support and hold the fish at or near the tail thereof, hold-down bars adapted to engage the fish at or near the head thereof to hold the same in position against said support, and links supporting said bars for parallel vertical movement to permit passage of the fish thereunder while maintaining the fish in contact with the under surface of the bars.

14. In a fish-treating machine, a support for said fish, conveyor means for conveying the fish sidewise on said support, said conveyor means comprising gripping devices adapted to support and hold the fish at or near the tail thereof, hold-down bars adapted to engage the fish at or near the head thereof to hold the same in position against said support, and a longitudinally extending rail supporting said bars, alternate bars being mounted on opposite sides of said rail with their ends overlapping to make a substantially continuous contact with said fish as the fish is advanced by said conveyor.

15. In a machine for beheading fish, a cutting member, conveyor means to feed fish sidewise thereto, means for positioning the fish on said conveyor means comprising a guide member adapted to engage the pectoral fin of the fish as the fish is advanced and to thereby shift the fish across said conveyor means to a predetermined position with respect to the cutting member, gripping devices adapted to grip the fish at or near the tail thereof as the fish is advanced, and a plurality of presser bars extending along said conveyor means in a position to engage the head of the fish to hold the same in proper position on said conveyor means.

16. In a machine for beheading fish, a cutting member, conveyor means to feed fish sidewise thereto, means for positioning the fish on said conveyor means comprising a guide member adapted to engage the pectoral fin of the fish as the fish is advanced and to thereby shift the fish across said conveyor means to a predetermined position with respect to the cutting member, gripping devices adapted to grip the fish at or near the tail thereof as the fish is advanced, a plurality of presser bars extending along said conveyor means in a position to engage the head of the fish to hold the same in proper position on said conveyor means, and spring means to hold each bar in pressure engagement with the fish.

17. In a machine for beheading fish, a cutting member, conveyor means to feed fish sidewise thereto, means for positioning the fish on said conveyor means comprising a guide member adapted to engage the pectoral fin of the fish as the fish is advanced and to thereby shift the fish across said conveyor means to a predetermined position with respect to the cutting member, gripping devices adapted to grip the fish at or near the tail thereof as the fish is advanced, a plurality of presser bars extending along said conveyor means in a position to engage the head of the fish to hold the same in proper position on said conveyor means, spring means to hold each bar in pressure engagement with the fish, and links supporting each bar for parallel vertical movement to permit passage of the fish thereunder.

18. In a machine for beheading fish, a cutting member, conveyor means to feed fish sidewise to said cutting member, a plate pivotally mounted adjacent said cutting member in alignment with the head of the fish, and spring means normally holding said plate in position to engage said head to assist the cutting member in removing the same.

19. In a machine for beheading fish, a cutting member, conveyor means to feed fish sidewise to said cutting member comprising gripping members adapted to grip the fish near the tail thereof and pins engaging the fish near the head thereof, said cutting member being positioned to sever the head at a point inside of said pins, and plates mounted outside of said pins and between said pins and said cutting member respectively to engage the head and strip the same from said fish.

20. In a fish-treating machine, conveyor means to feed the fish sidewise through said machine, a clamp adapted to grip the fish near the tail thereof, means holding said clamp open for a predetermined range of feed movement, and a flexible curtain mounted to engage the fish to position the same in said clamping means prior to the closing thereof.

21. In a machine for treating fish, conveyor means to feed fish sidewise through said machine, said conveyor means comprising a travelling arm against which the fish is positioned and a clamp adapted to grip the tail of the fish for holding the same in position against said arm, means holding said clamp open for a predetermined range of feed movement, and a flexible wiper mounted to engage the fish for positioning the same against said arm while said clamp is held open.

22. In a machine for treating fish, conveyor means to feed fish sidewise through said machine, said conveyor means comprising a travelling arm against which the fish is positioned, a clamp adapted to grip the tail of the fish for holding the same in position against said arm, means holding said clamp open for a predetermined range of feed movement, and a rubber curtain mounted to engage the fish for positioning the same against said arm while said clamp is held open.

CHARLES M. SAVRDA.